United States Patent Office 3,304,803
Patented Feb. 21, 1967

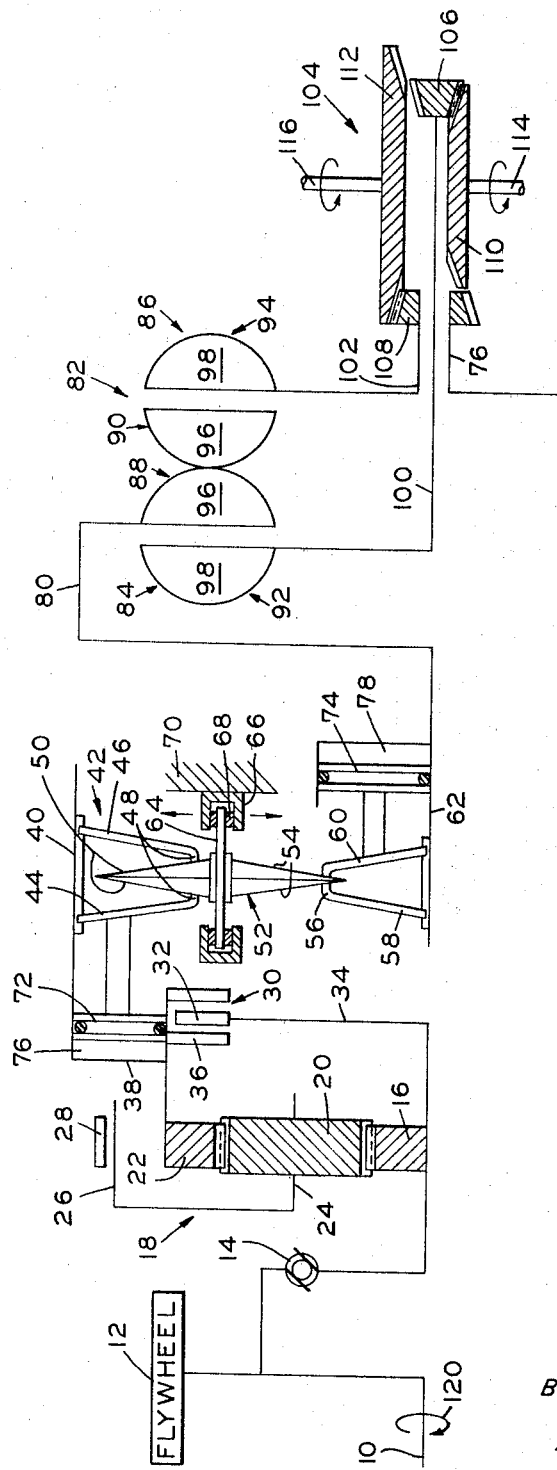

3,304,803
MOTOR VEHICLE TRANSMISSION PROVIDING HIGH TRACTION DRIVE
Thomas R. Stockton, Northville, Mich., assignor to Ford Motor Company, Dearborn, Mich., a corporation of Delaware
Filed Dec. 30, 1964, Ser. No. 422,173
6 Claims. (Cl. 74—665)

This invention relates to a motor vehicle drive train. More particularly, it relates to a mechanism for transmitting the torque of a power input shaft to a pair of rear axle drive shafts.

One of the objects of the invention is to construct a transmission for a motor vehicle that will provide an infinitely variable number of forward and reverse drives from a power input shaft to the rear axle drive shafts.

Another object of the invention is to construct a motor vehicle transmission with means that improves the tractive efforts of the rear wheels and yet eliminates the conventional differential gearing, the transmission providing a drive to the rear axles in a manner such that loss of traction by one wheel causes an increase in output shaft torque applied to the other wheel.

A further object of the invention is to provide a transmission in which a planetary gearset, an infinitely variable speed friction drive device, and a dual fluid coupling assembly are all serially connected from a power input shaft to a pair of rear axle drive shafts in a manner providing an infinitely variable speed drive of the rear axle drive shafts with improved traction to whichever of the rear axle drive shafts is rotating at a lesser speed.

A still further object of the invention is to provide a mechanism for transmitting the torque of an engine to a pair of rear axle drive shafts that is simple in construction, has relatively few controls, and is efficient in operation.

Other objects, features and advantages of the invention will become apparent upon reference to the succeeding, detailed description thereof, and to the drawing illustrating the preferred embodiment thereof; wherein the figure illustrates schematically a cross-sectional view of one-half of a transmission embodying the invention.

The figure shows a transmission having a power input shaft 10 that may be connected to any suitable source of power, such as, for example, the output shaft of a motor vehicle internal combustion engine. Shaft 10 has the usual flywheel 12, and is drive connected by a known type of vibration damper 14 to a sun gear 16 of a planetary gearset 18.

Gearset 18 is of a known three-element type. It includes a plurality (only one shown) of circumferentially spaced planet pinion gears 20 meshing with sun gear 16 and a ring or annulus gear 22. Planet gears 20 are rotatably mounted on and supported by an annular carrier member 24. The carrier has an outer drum-like extension 26, the outer face of which is adapted to cooperate with a brake band 28.

Brake band 28 may be of a known fluid pressure actuated, spring released type. It can be engaged or disengaged, selectively, with extension 26 to hold carrier 24 against rotation, to provide a reverse drive of ring gear 22 by sun gear 16, or can be released to condition the gearset for a further operation.

Gearset 18 is also provided with a direct drive clutch 30, which, when engaged, connects sun gear 16 and ring gear 22 for rotation at the same speed to thereby lock up the gearset. Clutch 30 also may be of a known fluid pressure actuated, spring released type. It includes a friction disc 32 secured for rotation with sun gear 16 by a drive connecting member 34. Disc 32 is interleaved with two friction discs 36 splined to an extension of ring gear 22.

Ring gear 22 has a further radial extension 38 that is splined or otherwise secured to the outer annular driving member 40 of a friction drive device 42.

Member 40 is internally splined to two oppositely facing, spaced conical driving discs 44, 46. The discs each have contact rims 48 engaging the cooperating conical surfaces 50 of an intermediate idler disc 52. The diametrically opposite surface portions 54 of idler disc 52 engage contact rims 56 extending laterally from two spaced conical inner discs 58, 60. These latter discs are axially slidably splined to an intermediate shaft 62. Idler disc 52 is axially slidably splined to a shaft 64 rotatably mounted in a member 66 on bearings 68. Member 66 is nonrotatably mounted in a stationary portion 70 of the transmission casing. It is movable radially, by any suitable means not shown, in opposite directions to vary the speed ratio of the disc drive in a manner to be described.

The disc drive operates in a known manner, producing a sliding fluid friction drive between the discs through the agency of a thin film of fluid sprayed or otherwise drawn into the contact region between the outer and inner disc contact rims 48 and 56 and idler disc 52.

The contact rims and idler disc are loaded into driving engagement with each other by a number of pistons 72, 74 operating in fluid pressure cylinders 76, 78. The pistons apply an axial pressure against the slidable left and right hand outer and inner discs 44 and 60, respectively, as shown. The oppositely facing right and left hand splined discs 46 and 58, respectively, are substantially fixed against axial sliding movement against backing members, not shown. Rotation of outer discs 44 and 46, therefore, rotates idler discs 52 in the same direction about stationary member 66 to rotate inner discs 58 and 60 in the opposite direction.

As stated previously, the disc drive is adjustable to vary the input to output shaft speed ratio in infinite amounts by radial movement of idler disc shaft mount 66 in either direction. This changes the radial position of disc 52 with respect to the points of contact of it with the contact rims of the outer and inner discs. That is, the speeds at which disc 52 is driven by discs 44 and 46, and the speeds at which disc 52 drives discs 58 and 60 changes in inverse proportion to the change in the radial distance of the points of contact from the axis of rotation of disc 52, due to the changes in peripheral velocity at the points of contact.

In the position shown, disc 52 is adjusted to produce a maximum overdrive of discs 58 and 60, with the distance from the outer disc contact rims 48 to the axis of shaft 64 being at a minimum, while the distance from the axis to the inner disc contact rims 56 is at a maximum. Accordingly, drive of disc 52 by discs 44, 46 will overspeed discs 58, 60 and drive shaft 62 at a speed greater than the speed of input shaft 10. Radial displacement of mount 66 toward discs 44, 46 increases the distance from the outer disc contact rims 48 to the axis of disc 52, thus decreasing the speed of rotation of the hub of disc 52. A corresponding decrease in the peripheral speed of its points of contact with the disc 58, 60 results due to the decreased radial distance between the contact rims of discs 58, 60 and the axis of disc 52. The net change results in a reduction in speed of discs 58, 60 as compared to the speed for the previous setting of the mount 66. Further adjustment of mount 66 can be made in infinite amounts to a predetermined minimum underdrive ratio, at which the discs 58, 60 rotate at a speed slower than the speed of input shaft 10.

It is to be noted that the pistons 72, 74 are actuated to move discs 44 and 60 in timed relation to the radial movement of mount 66, to accommodate the axial movement of disc 52 on its splines.

Shaft 62 is drivingly connected to the annular impeller shell 80 of a dual fluid coupling assembly 82. This assembly comprises two back-to-back fluid couplings 84 and 86, each of which has an impeller member 88, 90 and a turbine member 92, 94. Each of the couplings is of a known type, the impeller members having outer annular shrouds fixed to each other and to the input shell member 80, as shown. The shrouds are secured to and enclose a number of circumferentially spaced impeller or pump blades 96. The sets of pump blades each face a set of similarly shaped and circumferentially spaced turbine blades 98 secured to and enclosed by an annular shroud.

Each of turbines 92 and 94 is secured by a shaft 100, 102 to the rear axle assembly identified as a whole at 104. This latter assembly includes separate pinion gears 106 and 108 fixed on turbine shafts 100 and 102 and meshing with ring gears 110 and 112. The ring gears are secured to rear axle drive shafts 114 and 116 extending at right angles thereto. The pinion and ring gears are shown as of different diameters. However, the reduction drive ratio of the two sets of gears is equal so that drive shafts 114 and 116 will rotate at the same speed when turbines 92 and 94 are rotating at the same speed.

The construction of the rear axle assembly as described permits elimination of the usual differential gearing in a motor vehicle. It also provides a greater tractive effort to whichever of the rear axle drive shafts is rotating at a slower speed. For example, assume that both of turbines 92 and 94 are rotating at the same speed. The torque to drive shafts 114 and 116 from shaft 80 is, therefore, equally divided between the output shafts, and both shafts 114 and 116 rotate at the same speed. Assume now that one of the rear wheels, say, the wheel secured to shaft 114, for example, encounters ice. This shaft immediately loses traction; that is, substantially no torque is required to now drive shaft 114. In the conventional differential, this would immediately stall turbine 94, and shaft 116 would not rotate. With the construction described, however, a loss of traction to shaft 114 immediately transfers the input torque of shaft 80 to turbine 94 to apply this torque to output shaft 116. The end result is that torque is applied to the shaft driving the wheel that is not on ice or slipping, and movement of the vehicle is provided.

In overall operation, a neutral is established by releasing brake band 28 and clutch 30. With the vehicle rear wheels stationary, shafts 114 and 116 are stationary and resist rotation of turbines 92 and 94. This reaction acts back through the friction drive 42 onto ring gear 22 tending to hold it stationary. Since brake band 28 is released, carrier 24 is free to rotate. A forward or clockwise rotation of input shaft 10 in the direction of arrow 120, therefore, drives sun gear 16 forwardly and rotates pinion gears 20. Since ring gear 22 is stationary, the pinion gears walk around within the ring gear and freely rotate carrier 24 without providing a drive of ring gear 22.

A forward condition of operation is established by engaging clutch 30 and conditioning the friction drive device 42 for a maximum underdrive ratio. This is done by moving carrier 66 of disc 52 inwardly toward inner discs 58 and 60. Gearset 18 is now conditioned for a direct drive. The outer annular portion 40 of disc drive 42, therefore, rotates at engine speed. Forward clockwise rotation of input shaft 10 and portion 40 drives discs 44, 46 and 52 in the same direction to rotate inner discs 58 and 60 in the opposite direction and at a speed reduced from that of shaft 10. This drive is transmitted to impeller members 88 and 90 to rotate turbines 92 and 94 at the same speed and drive axle shafts 114 and 116 at equal speeds. If equal tractive effort is being applied by both rear wheels, the torque applied by turbines 92 and 94 will also be equal. If one or the other of the rear axle shafts encounters ice or slipping conditions, the turbine for the opposite shaft will have a greater torque applied to it, in the manner previously described.

Once output shafts 114 and 116 begin rotating, the friction disc device 42 will be adjusted so as to progressively decrease the reduction drive as a function of the progressive increase in the speeds of axle shafts 114 and 116. The friction drive unit 42 will, therefore, progressively be changed from a maximum underdrive to a direct drive and then to an overdrive condition, so that ultimately the axle drive shafts 114 and 116 will be driven at the maximum speed with respect to engine shaft 10.

A reverse drive is obtained by releasing clutch 30, engaging brake band 28, and conditioning the friction drive 42 for a maximum underdrive. With carrier 24 stationary, forward rotation of shaft 10 and sun gear 16 rotates planet gears 20 in the opposite direction to drive ring gear 22 in reverse. The resulting forward drive of discs 58 and 60 and output shafts 114 and 116 is in a direction opposite to that provided during forward drive operation.

The control for the fluid pressure adjustment of the drive ratio through the friction drive device 42 is not shown, since it is known and any suitable means may be used to automatically control the changes in the hydraulic pressure to vary the ratio. For example, controls are known in which the drive ratio is automatically varied in accordance with vehicle output shaft speed and engine accelerator pedal position.

While the dual fluid coupling assembly is shown as being of the continuously filled type, it will be clear that it is within the scope of the invention to provide two back-to-back fluid couplings of the fill and empty type so that they could be emptied of fluid and thereby provide a neutral condition of operation by breaking the driving connection between the annular shell 80 and the rear axle shafts 114 and 116.

From the foregoing, it will be seen that the invention provides a mechanism between the engine drive shaft and the rear axle drive shafts that not only provides an infinitely variable number of forward and reverse drives to the axle shafts, but does so in a manner providing equal tractive efforts to both of the axle shafts during normal operation, and more tractive effort to the axle shaft requiring it when conditions such as ice are encountered.

While the invention has been illustrated in its preferred embodiment in the figure, it will be clear to those skilled in the arts to which the invention pertains that many changes and modifications may be made thereto without departing from the scope of the invention.

I claim:

1. An infinitely variable speed torque transmitting mechanism for connecting a forwardly rotating power input shaft to a pair of rear axle drive shafts comprising, in combination, a planetary gearset and an adjustable infinitely variable speed friction drive device and a hydrodynamic drive device all serially connected, said gearset and friction drive device each having a plurality of rotatable members including drive and driven and reaction members, means operably connecting said gearset drive member to said input shaft and said gearset driven member and friction device drive member together, means for holding said reaction members stationary, said latter means for said gearset reaction member being releasable to condition said gearset for a reverse drive of its said driven member, direct drive clutch means engageable at times to connect said gearset drive and driven members for a forward direct drive through said gearset, said hydrodynamic drive device having a plurality of pump members and a plurality of turbine members, means operably connecting said pump members together and to the friction drive driven member, and means operably connecting said turbine members each to a different one of said rear axle shafts, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the remaining axle shaft for greater tractive effort.

2. An infinitely variable speed torque transmitting mechanism for connecting a forwardly rotating power input shaft to a pair of rear axle shafts comprising, in combination, a planetary gearset and an adjustable infinitely variable speed friction drive device and a hydrodynamic drive device all serially connected, said gearset having a plurality of rotatable members including drive and driven and reaction members, means operably connecting said gearset drive member to said input shaft, said friction drive device having a pair of spaced friction members frictionally engaged by an idler element therebetween for the drive in one direction of one of said friction members upon rotation of the other friction member in the opposite direction, means connecting said gearset driven member and one of said friction members together, releasable means for holding said gearset reaction member stationary to condition said gearset for a reverse drive of its said driven member, direct drive clutch means engageable at times to connect said gearset drive and driven members for a forward direct drive through said gearset upon release of said releasable means, said hydrodynamic drive device having a plurality of pump members and a plurality of turbine members, means operably connecting said pump members together and to the friction driven member, and means operably connecting said turbine members each to a different one of said rear axle shafts, said latter means comprising gearsets each having a ring gear rotatable with an axle shaft and meshing with a pinion gear, means securing each pinion gear for rotation with a separate one of said turbines, said rear axle gearsets having equal gear ratios, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the other axle shaft for greater tractive effort.

3. An infinitely variable speed torque transmitting mechanism for connecting a forwardly rotating power input shaft to a pair of rear axle shafts comprising, in combination, a planetary gearset and an adjustable infinitely variable speed friction drive device and a hydrodynamic drive device all serially connected, said gearset having a plurality of rotatable members including drive and driven and reaction members, means operably connecting said gearset drive member to said input shaft, said friction drive device having a pair of spaced friction members frictionally engaged by an idler element therebetween for the drive in one direction of one of said friction members upon rotation of the other friction member in the opposite direction, means connecting said gearset driven member and one of said friction members together, releasable means for holding said gearset reaction member stationary to condition said gearset for a reverse drive of its said driven member, direct drive clutch means engageable at times to connect said gearset drive and driven members for a forward direct drive through said gearset upon release of said releasable means, said hydrodynamic drive device having a plurality of pump members and a plurality of turbine members, means operably connecting said pump members together and to the friction driven member, and means operably connecting said turbine members each to a different one of said rear axle shafts, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the other axle shaft for greater tractive effort.

4. An infinitely variable speed torque transmitting mechanism for connecting a forwardly rotating power input shaft to a pair of rear axle shafts comprising, in combination, a planetary gearset and an adjustable infinitely variable speed friction disc drive device and a hydrodynamic drive device all serially connected, said gearset having a plurality of rotatable members including drive and driven and reaction members, means operably connecting said gearset drive member to said input shaft, said friction disc drive device having pairs of spaced friction discs members with contact rims frictionally engaging an idler disc element therebetween for the drive in one direction of one of said pairs of friction disc members upon rotation of the other pair of friction members in the opposite direction, means connecting said gearset driven member and one of said pair of friction disc members together, releasable means for holding said gearset reaction member stationary to condition said gearset for a reverse drive of its said driven member, direct drive clutch means engageable at times to connect said gearset drive and driven members for a forward direct drive through said gearset upon release of said releasable means, said hydrodynamic drive device having a plurality of pump members and a plurality of turbine members, means operably connecting said pump members together and to the friction disc driven member, and means operably connecting said turbine members each to a different one of said rear axle shafts, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the other axle shaft for greater tractive effort.

5. An infinitely variable speed torque transmitting mechanism for connecting a forwardly rotating power input shaft to a pair of rear axle shafts comprising, in combination, a planetary gearset and an adjustable infinitely variable speed friction disc drive device and a hydrodynamic drive device all serially connected, said gearset having a plurality of rotatable members including sun and ring gears and a planet gear carrier, means operably connecting one of said sun and ring gears to said input shaft, said friction disc drive device having pairs of spaced friction disc members with contact rims frictionally engaging an idler disc element therebetween for the drive in one direction of one of said pairs of friction disc members upon rotation of the other pair of friction members in the opposite direction, means connecting the other of said sun and ring gears and one of said pairs of friction disc members together, releasable means for holding said carrier stationary to condition said gearset for a reverse drive of the other of said sun and ring gears, direct drive clutch means engageable at times to connect said sun and ring gears for a forward direct drive through said gearset upon release of said releasable means, said hydrodynamic drive device having a plurality of pump members and a plurality of turbine members, means operably connecting said pump members together and to the friction disc driven members, and means operably connecting said turbine members each to a different one of said rear axle shafts, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the other axle shaft for greater tractive effort.

6. An infinitely variable speed torque transmitting mechanism for connecting a forwardly rotating power input shaft to a pair of rear axle shafts comprising, in combination, a planetary gearset and an adjustable infinitely variable speed friction disc drive device and a hydrodynamic drive device all serially connected, said gearset having a plurality of rotatable members including sun and ring gears and a planet gear carrier, means operably connecting one of said sun and ring gears to said input shaft, said friction disc drive device having pairs of spaced friction disc members with contact rims frictionally engaged by an idler disc element therebetween for the drive in one direction of one of said pairs of friction disc members upon rotation of the other pair of friction members in the opposite direction, means connecting the other of said sun and ring gears and one of said pairs of friction disc members together, releasable means for holding said carrier stationary to condition said gearset for a reverse drive of the other of said sun and ring gears, direct drive clutch means engageable at times to connect said sun and ring gears for a forward direct drive through said gearset upon release of said releasable means, said hydrodynamic drive device having a plurality of pump members and a plurality of turbine members, means operably connecting said pump members together and to the other pair of friction disc members, and means operably connecting said turbine members each to a different one of said rear axle shafts, said latter means comprising gearsets each having a ring gear rotatable with an axle shaft and meshing with a pinion gear, means securing each pinion gear for rotation with a separate one of said turbines, said rear axle gearsets having equal gear reduction ratios, the respective engagement or release of said clutch means and release or engagement of the gearset reaction member holding means providing alternately a forward and reverse infinitely variable speed drive to said axle shafts, the faster rotation of one of said axle shafts relative to the other effecting a greater application of torque from said pump to the other axle shaft for greater tractive effort.

References Cited by the Examiner
UNITED STATES PATENTS

| | | | |
|---|---|---|---|
| 1,278,256 | 9/1918 | Thompson | 74—665 |
| 1,279,671 | 9/1918 | Denning | 74—665 |
| 2,360,234 | 10/1944 | Jandasek | 74—720 |
| 2,468,107 | 4/1949 | Powell | 74—650 |
| 3,203,278 | 8/1965 | General | 74—740 X |

DAVID J. WILLIAMOWSKY, *Primary Examiner.*

T. C. PERRY, *Assistant Examiner.*